Patented May 20, 1941

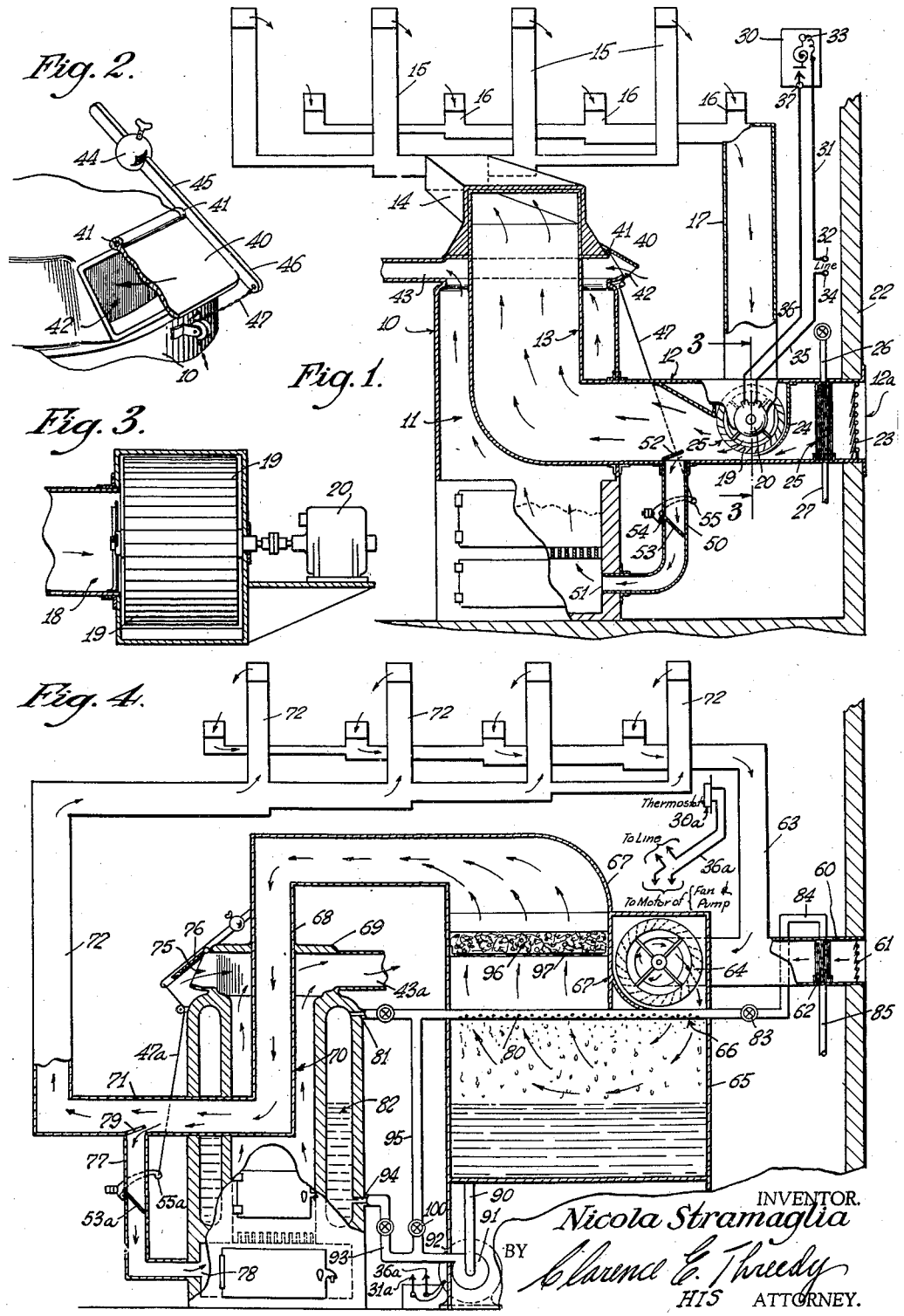

2,242,802

UNITED STATES PATENT OFFICE 2,242,802

HEATER SYSTEM

Nicola Stramaglia, Chicago, Ill.

Application October 13, 1938, Serial No. 234,816

12 Claims. (Cl. 236—11)

This invention relates to air conditioning apparatus and has as one of its particular objects the provision of an improved heating and humidifying apparatus especially suitable for use in dwellings and the like which are equipped with a water, air, or other heating device or plant, the invention providing means for circulating air from the atmosphere, admixed with air from the dwelling apartments, through a moistening or humidifying means of particular construction and arrangement, and thereafter passing the moistened air through a heating means cooperable with the water, air, or other heating plant for circulation through the dwelling apartments.

Another object is the provision of automatic control means regulated by the relative humidity and temperature of the air in the dwelling apartments and arranged to control the drafts in the water, air, or other local heating plant with which the conditioning apparatus is associated.

Other objects, economies, and novel aspects peculiar to the invention reside in certain details of construction, location, form, and mode of operation of the various parts of the illustrative embodiment described herein in conjunction with the annexed drawing, in which:

Fig. 1 is a schematic layout of the air conditioning apparatus showing the heating plant and air circulating means in vertical section;

Fig. 2 is a perspective view of a check damper;

Fig. 3 is a sectional view through the blower taken along line 3—3 of Fig. 1; while Fig. 4 is another schematic layout showing portions of the hot water heater and a modified form of humidifying means in the conditioning apparatus.

In the preferred embodiment illustrated in Fig. 1, the novel conditioning apparatus and control means is associated with a local heating plant or furnace 10 of the hot air type including in its upper region an air jacket 11 disposed above the grate or firebox and through a side wall of which passes the horizontal section 12 of an air circulating duct. The horizontal section connects with a vertical heating section 13 disposed within the jacket 11 and passing through the top of the furnace for communication with a distributing duct 14 having a plurality of branches 15 feeding into a plurality of apartments or rooms in a dwelling, there being a return circuit for the air through the ducts 16 which feed into a return duct 17 having a discharge end 18 communicating with the intake side of a blower or air moving means 19 (Figs. 1 and 3) arranged in the horizontal intake section 12.

The air impeller or blower 19 is driven by a motor 20 arranged in a special control circuit hereinafter to be described, and air is drawn in part through the duct 17 and in part through the open end 12a of the feeding duct 12, which is arranged to communicate with the atmosphere exteriorly of a wall 22 of the building in which the plant is situated, a suitable baffle or louver grating 23 being arranged to permit ingress, but not egress, of air from the duct 12, and the blower 19 having a peripheral shielding jacket 24 which is open in the region 25 in such manner that the rotating blower drum will draw air both from duct 17 and through the intake 12a and force such air upwardly through the heating section 13.

Means for moistening or humidifying the freshly admixed air, includes the provision of a moistening means 25 in the horizontal duct section between the blower 19 and the intake 12a, this moistening means in the present instance being in the form of an upright caging or grating in which there are disposed closely arranged pieces of sponge material through which water is circulated from a valved water feed pipe 26 feeding into the upper region of the sponges, and the excess moistening water being drained off through a discharge pipe 27 leading from the lower region of the sponge housing or grating. The fresh incoming air passes readily through the sponging and absorbs a greater or less amount of moisture, and when this moistening air reaches the vertical heating duct 13 in the hot air heater, its temperature is raised suitably for the purpose of heating the dwelling apartments to which the air is fed by the duct means 14 and 15, it being pointed out that due to the moisture content of the air, the efficiency of the heating plant is increased because of the ability of the premoistened air to absorb and retain greater amounts of heat energy prior to distribution. Moreover, the efficiency of the plant is further supported by the arrangement of the automatic feeding baffles or louvers 23, which in the arrangement shown are of the gravity blade type with the blades normally in overlapping relation so that only a slight amount of fresh air will bleed into the circulated air in the system at a rate which may be predetermined and adjusted in accordance with the needs of a particular installation. Where for any reason the normal volume of air cannot be circulated and does not reach the intake 18 of the blower, the automatic fresh air intake and baffle means 23 will permit any required volume of fresh air to enter the circuit.

A novel control feature resides in the provision of a control device 30 in one or more of the apartments of the dwelling, this device being preferably in the form of a combination temperature and humidity indicating control of which there are a variety of well-known types on the market and which are operable to close a circuit through a switch or relay, as the requirements demand, when either the temperature or relative humidity in the room in which the device is situated falls below a predetermined value. In the present instance a simple thermostat is contemplated as the control 30, and the control circuit includes the connection of a conductor 31 leading from one terminal 33 of the thermostatic switch to a terminal 32 of the power line, the opposite terminal 34 of the power line being connected by conductor 35 to one of the terminals of the motor 20, and the remaining terminal of the motor being connected by conductor 36 to the remaining switch terminal 37 of the thermostatic control device 30.

When the temperature in the dwelling or other apartment falls below a predetermined value at which the thermostat 30 has been set, the motor circuit will be closed through the contacts 37 and 33, and air will be forced, in the manner heretofore described, through the duct sections 12, 13, and 17.

The heating plant with which the conditioning apparatus is associated is provided with a check damper 40 pivoted as at 41 (Fig. 2 also) on the upper portion of the furnace and arranged to open and close the mouth 42 of an air passage in the top of the furnace and which leads through a duct or breeching 43 to the stack. The damper 40 is provided with a counterweight 44 on a lever arm 45 also pivoted as at 41 and having a lever extension 46 to which is connected one end of an operating chain 47. The damper 40 is a familiar provision on heating plants of this type and is arranged so that when the damper gate is closed, the draft rising through the grate from the ash pit will accelerate the rate of combustion and hence increase the resulting temperatures. When the damper is opened, the draft through the bed of the fire is substantially cut off, due to the by-passing of air through the duct 43.

The automatic control apparatus of my invention includes the further provision of a by-pass duct 50 having one of its ends communicating from the horizontal duct section 12, at a point in advance of the blower 19, through the lower side of the furnace to terminate in a discharge mouth 51 in the ash pit or at a point below the grate. A deflecting vane 52 is arranged at the mouth of the by-pass duct so that a certain amount of the advancing air from the blower will be shunted into the duct 50 and into the ash pit to increase the draft. A control valve 53 is arranged in the duct 50 and is pivoted as at 54 for opening and closing movement to restrict or shut off the flow of air through the duct 50, there being a counterweighted operating lever 55 for opening and closing the valve, and this lever being connected with the opposite end of the chain 47 so that when the vane of the valve 53 moves into non-restricting or duct opening position the arm 55 will be lowered, exerting a pull on the chain and a consequent closing of the check damper 40 against the opening effort of the counterweight 44.

The arrangement of the duct 50, the deflector 52, and the vane or valve member 53, is such that when the blower 19 is set in motion, air driven by the same will be shunted against the vane 53 and open the valve, so that the shunted air will pass into the fire pit and greatly increase the draft, and at the same time the check damper 40 will be closed, preventing any by-pass of draft through the duct 43, with the result that the temperature in the heater will be quickly and greatly increased, such action continuing until the temperature in the apartments has been restored to its predetermined value, so that the thermostatic control 30 may be operated to stop the motor 20 whereupon the valve 53 will close and the damper 40 open so that the draft through the fire bed will be reduced and the fire may be permitted to idle.

In Fig. 4, there is shown a modification which is suitable for larger installations and which is adapted for cooperation with a heating plant of the hot water type. In this arrangement the horizontal intake duct 60 is provided with a baffle or louver control 61 similar to the device 23 of Fig. 1, and also with a pre-moistening means in the form of the sponging 62. A return duct 63 leading from the various apartments through which the air is circulated, feeds into the duct 60 at a point between the moistening means 62 and the intake of a blower 64.

Means for washing and humidifying the air includes the provision of a tank 65 communicating as at 66 with the discharge side of the blower 64 and having a relatively wide discharge duct 67 in its upper region and feeding into a heating duct 68 which passes downwardly through the top of a hot water heater 69 through the air jacket 70 thereof and out through a side of the heater in a second horizontal section 71 for connection with the distributing ducts 72 which terminate variously in the apartment supplied.

The heater 69 is provided with a check damper 75 counterweighted by a lever arm mechanism 76 substantially identical to the arrangement 40—44—45 of Figs. 1 and 2 and operable to control the draft through the fire pit in precisely the same manner as described in conjunction with these latter figures.

A by-pass duct 77 similar to the duct 50 of Fig. 1 communicates at its upper end or mouth from the heater duct section 71 back at its lower end 78 into the ash pit, and the upper end or mouth portion of the by-pass is provided with deflecting means 79 arranged in the path of the advancing air stream so as to shunt a portion of the conditioned air into the ash pit for the purpose of increasing the rate of combustion as heretofore described.

Means for washing the air and moistening the same in addition to the moistening function of the sponge means 62, includes the provision of a spray duct or pipe 80 extending transversely across the tank 65 from a connection 81 with the upper region of the furnace water jacket 82 surrounding the hot air jacket 70, the opposite end of the spray pipe emerging from the tank 65 for connection through a valve 83 with the feed pipe 84 leading into the moistening or sponge means 62. A discharge pipe 85 leads the excess water from the first or primary moistening means 62 to a suitable gutter or drain.

A return pipe 90 leads from the bottom of the tank 65 to the intake of a pump 91 driven by an electric motor 92. The discharge side of the pump communicates through a valved pipe 93 to a connection 94 in the lower region of the water jacket 82, there being a valved by-pass pipe 95 shunted between the connections 81 and 94 with the water jacket for purposes which will hereinafter appear.

A water absorbing means preferably in the form of an aggregate of sponge material 96 supported in a suitable grating 97, is arranged across the mouth of the discharge duct portion 67 of the tank 65 and serves as a means for regulating the moisture content of the air delivered to the heater.

The control means for the motor of the blower 64 is identical to that described in conjunction with the arrangement of Fig. 1 and includes a thermostatic switch 30a connected by conductors 31a and 36a to a power source and the motor (not shown) for the blower 64. The motor 92 for the water pump is also connected in parallel with the motor of the blower 64 so that when the thermostatic switch 30a closes, both the blower 64 and the pump 91 will be actuated.

In the operation of the arrangement of Fig. 4, the thermostat 30a is set for a desired constant temperature, and variations from this temperature will effect a closing of the thermostatic switch means with a consequent operation of the blower 64 and the pump 91. Air will be drawn from the duct 63, as well as through the duct 60 and primary moistening means 62, into the tank 65 and pass through a water spray from the pipe 80, residual water from the bottom of the tank 65 being forced by the pump 91 into and through the jacket 82 back into the pipe 80 until the water in the tank 65 reaches the temperature of the water in the heater jacket, so that the incoming air is not only washed by the water spray, but is also heated.

Thereafter, the air rises through the absorbing means 96 where a portion of the moisture is removed, and the air passes down through the heating duct 68 in the air jacket of the furnace and out through the discharge section 71 where a portion of the conditioned air is shunted by means 79 through the by-pass duct 77 against the vane 53a of a control valve identical to the valve means 53—54—55 of Fig. 1, this valve having a lever arm 55a connected by a chain 47a to the counterbalanced lever arm 76 on the check damper. The by-passed air opens the valve 53a and closes the check damper, thereby increasing the draft through the fire bed and quickly raising the temperature of the water 82 and the air in the air jacket. When the predetermined temperature or humidity condition is restored in the apartment, the thermostatic device 30a will shut off the blower and the pump, and since the air pressure in the by-pass duct 77 is lowered, the valve 53a will close, thus permitting the check damper 75 to open so that the fire draft may be shunted in the usual manner through the breeching duct 43a, allowing the fire to smolder.

The water by-pass pipe 95 is useful in converting the mechanism to an air cooling device for use when the hot water heater 69 is not in use. By closing the valve in the pump discharge pipe 93 and opening the valve 100, water may be by-passed from the pump directly into the spray pipe 80, the valve between the latter and its connection 81 first being closed and the valve 83 also being closed to cut out the primary moistening means 62. When thus arranged, cool water may be sprayed through the incoming air to cool the latter and excessive moisture removed therefrom by the absorbing means 96.

Having thus described my invention, what I claim as new and desire to protect by Letters Patent is:

1. In combination with a heating device and combustion means for heating the same, a draft intake duct arranged to deliver air for combustion to said combustion means, a draft damping valve arranged for operation to provide an idling draft for said combustion means when the latter is operating to provide a relatively low heat, means for circulating air relative to said heating device prior to distribution to a utilization means, said draft intake duct being connected with said circulating means to by-pass a portion of air from the latter for movement relative to said combustion means, normally closed draft valve means in said draft intake duct and arranged to be opened by air by-passed as aforesaid to increase the draft relative to said combustion means when said circulating means is in operation, and means providing an operative connection between said last-mentioned valve means and said draft damping valve whereby the latter will be closed when said draft valve means is opened.

2. Air conditioning apparatus including, in combination, a combustion device having a draft intake duct, power-driven means for circulating air relative to said combustion means for the purpose of heating said air and delivering the heated air to a place of utilization, temperature responsive control means arranged in said place of utilization and arranged to connect said power-driven means with a source of power when the temperature falls below a predetermined value, said draft intake duct being connected with said circulating means so as to divert a portion of the air circulated therethrough relative to said combustion means, a normally closed draft valve arranged in said draft intake duct and operable by air diverted into the latter as aforesaid to open and permit movement of the diverted air relative to said combustion means to increase the rate and heat of combustion to accelerate the heating of said circulated air, and a draft check valve for said combustion means and operatively connected with said draft valve for coaction with the latter, such that the check valve will be closed when the draft valve is opened and vice versa.

3. Air conditioning apparatus including a combustion heater, means for forcing air to be heated through said heater and a utilization circuit back to the heater, means for automatically admixing fresh atmospheric air with the air in said circuit depending upon the pressure in the air circuit, means for adding moisture to the admixed fresh air; and means operated by air pressure diverted from in said circuit for controlling the flow of air for combustion to said heater.

4. Air conditioning apparatus including a combustion heater, means for forcing air to be heated through said heater and a utilization circuit back to the heater, means including a baffle of normally closed louvers communicating with the atmosphere and which may be opened to admit air in one direction responsive to a predetermined air pressure in said direction, for automatically admixing fresh air with the circulated air depending on the volume of air displaced in said circuit, means for adding moisture to the admixed fresh air, and means operated by air pressure in said circuit for controlling the flow of air for combustion to said heater.

5. Air conditioning apparatus including a combustion heater, means for forcing air to be heated through said heater and a utilization circuit back to the heater, means for automatically admixing fresh atmospheric air with the circulated air depending upon the pressure in the air circuit, means for adding moisture to the admixed fresh air, and means operated by air pressure in said circuit for shunting a portion of the air from the circulatory system into the combustion heater to raise the heat of combustion therein, a draft by-pass and check damper for said heater, and means actuated by air shunted as aforesaid for operating said check damper to close said by-pass.

6. The combination, with a heating plant of the combustion type having a hot water jacket, draft damper, and check damper, of air conditioning means including air circulating ducts arranged to circulate air relative to an apartment and said heater, a washing tank connected with said duct means and blower means arranged to effect circulation of air through said duct means and said tank, means in said tank connected with said water jacket for spraying water from the latter into the path of air moved through said tank as aforesaid, power-driven pump means arranged to force water sprayed into said tank back into said jacket and from the jacket via said spray means into said tank, said check damper and draft damper being arranged in a normal condition to provide a predetermined draft for the combustion means of the heater, mechanism actuated by circulated air for operating said check damper and draft damper to increase the rate of combustion when air is circulated by said blower means, together with temperature-operated means situated in said apartment and effective when the temperature therein varies from a predetermined value to energize said blower means and said power-driven pump means.

7. The combination, with a heating plant of the combustion type having a hot water jacket, draft damper, and check damper, of air conditioning means including air circulating ducts arranged to circulate air relative to an apartment and said heater, a washing tank connected with said duct means and blower means arranged to effect circulation of air through said duct means and said tank, means in said tank connected with said water jacket for spraying water from the latter into the path of air moved through said tank as aforesaid, power-driven pump means arranged to force water sprayed into said tank back into said jacket and from the jacket via said spray means into said tank, said check damper and draft damper being arranged in a normal condition to provide a predetermined draft for the combustion means of the heater, mechanism actuated by circulated air for operating said check damper and draft damper to increase the rate of combustion when air is circulated by said blower means, together with temperature-operated means situated in said apartment and effective when the temperature therein varies from a predetermined value to energize said blower means and said power-driven pump means, means in said tank for absorbing moisture from the air washed therein by said spray prior to circulation of said air relative to said heater.

8. The combination, with a heating plant of the combustion type having a hot water jacket, draft damper, and check damper, of air conditioning means including air circulating ducts arranged to circulate air relative to an apartment and said heater, a washing tank connected with said duct means and blower means arranged to effect circulation of air through said duct means and said tank, means in said tank connected with said water jacket for spraying water from the latter into the path of air moved through said tank as aforesaid, power-driven pump means arranged to force water sprayed into said tank back into said jacket and from the jacket via said spray means into said tank, said check damper and draft damper being arranged in a normal condition to provide a predetermined draft for the combustion means of the heater, mechanism actuated by circulated air for operating said check damper and draft damper to increase the rate of combustion when air is circulated by said blower means, together with temperature-operated means situated in said apartment and effective when the temperature therein varies from a predetermined value to energize said blower means and said power-driven pump means, and a second duct means connected with said first-mentioned duct means and communicating with the atmosphere and provided with automatic shutter means for admixing atmospheric air with the circulated air at a rate depending upon the pressure in said first-mentioned duct means.

9. The combination, with a heating plant of the combustion type having a hot water jacket, draft damper, and check damper, of air conditioning means including air circulating ducts arranged to circulate air relative to an apartment and said heater, a washing tank connected with said duct means and blower means arranged to effect circulation of air through said duct means and said tank, means in said tank connected with said water jacket for spraying water from the latter into the path of air moved through said tank as aforesaid, power-driven pump means arranged to force water sprayed into said tank back into said jacket and from the jacket via said spray means into said tank, said check damper and draft damper being arranged in a normal condition to provide a predetermined draft for the combustion means of the heater, mechanism actuated by circulated air for operating said check damper and draft damper to increase the rate of combustion when air is circulated by said blower means, together with temperature-operated means situated in said apartment and effective when the temperature therein varies from a predetermined value to energize said blower means and said power-driven pump means, and a second duct means connected with said first-mentioned duct means and communicating with the atmosphere and provided with automatic shutter means for admixing atmospheric air with the circulated air at a rate depending upon the pressure in said first-mentioned duct means, and primary moistening means arranged in said second duct means in the path of admixed air for moistening such air prior to entry in the circulatory system, and means connected with said spray means and providing a source of water for said primary moistening means.

10. The combination, with a heating plant of the combustion type having a hot water jacket, draft damper, and check damper, of air conditioning means including air circulating ducts arranged to circulate air relative to an apartment and said heater, a washing tank connected with said duct means and blower means arranged to effect circulation of air through said duct means and said tank, means in said tank connected with said water jacket for spraying water from the latter into the path of air moved through said tank as aforesaid, power-driven pump means arranged to force water sprayed into said tank back into said jacket and from the jacket via said spray means into said tank, said check damper and draft damper being arranged in a normal condition to provide a predetermined draft for the combustion means of the heater, mechanism actuated by circulated air for operating said check damper and draft damper to increase the rate of combustion when air is circulated by said blower means, together with temperature-operated means situated in said apartment and effective when the temperature therein varies from a predetermined value to energize said blower means and said power-driven pump means, means in said tank for absorbing moisture from the air washed therein by said spray prior to circulation of said air relative to said heater, and a second duct means connected with said first-mentioned duct means and communicating with the atmosphere and provided with automatic shutter means for admixing atmospheric air with the circulated at a rate depending upon the pressure in said first-mentioned duct means, and primary moistening means arranged in said second duct means in the path of admixed air for moistening such air prior to entry in the circulatory system, and means connected with said spray means and providing a source of water for said primary moistening means.

11. Air conditioning apparatus including, in combination, a heater having a hot water jacket, an air washing tank, duct means for directing air from said tank through said heater and into a place of utilization, blower means for moving air into said tank through said duct means, means for spraying water through air in said tank and connected with said water jacket to receive hot water from the latter, means for pumping water from said tank back into and through said water jacket into the tank, and temperature responsive means for controlling said pump when the temperature at said place of utilization varies from a predetermined figure.

12. Air conditioning apparatus including, in combination, a heater having a hot water jacket, an air washing tank, duct means for directing air from said tank through said heater and into a place of utilization, blower means for moving air into said tank through said duct means, means for spraying water through air in said tank and connected with said water jacket to receive hot water from the latter, means for pumping water from said tank back into and through said water jacket into the tank, and temperature responsive means for controlling said pump when the temperature at said place of utilization varies from a predetermined figure, and means in said tank for removing a predetermined amount of moisture from the water circulated therethrough, said means including an arrangement of sponge material disposed across the path of air emerging from said spray into said duct means.

NICOLA STRAMAGLIA.